(12) United States Patent
Moriya

(10) Patent No.: US 11,065,970 B2
(45) Date of Patent: Jul. 20, 2021

(54) CONTROL DEVICE OF VEHICLE WITH OVERHEAT PROTECTION CONTROL

(71) Applicant: TOYOTA JIDOSHA KABUSHIKI KAISHA, Toyota (JP)

(72) Inventor: Yuki Moriya, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 16/538,995

(22) Filed: Aug. 13, 2019

(65) Prior Publication Data

US 2020/0101866 A1 Apr. 2, 2020

(30) Foreign Application Priority Data

Sep. 27, 2018 (JP) .............................. JP2018-182510

(51) Int. Cl.
| | |
|---|---|
| *B60L 53/14* | (2019.01) |
| *B60L 58/25* | (2019.01) |
| *B60L 50/60* | (2019.01) |
| *B60L 3/04* | (2006.01) |
| *B60L 3/00* | (2019.01) |
| *H02J 7/00* | (2006.01) |
| *B60L 53/18* | (2019.01) |

(52) U.S. Cl.
CPC .............. *B60L 53/14* (2019.02); *B60L 3/0023* (2013.01); *B60L 3/04* (2013.01); *B60L 50/60* (2019.02); *B60L 58/25* (2019.02); *H02J 7/00309* (2020.01); *B60L 53/18* (2019.02)

(58) Field of Classification Search
CPC .......... B60L 53/14–18; B60L 58/24–27; H02J 7/00304; H02J 7/00309
See application file for complete search history.

(56) References Cited

U.S. PATENT DOCUMENTS

| | | | | |
|---|---|---|---|---|
| 5,309,073 A | * | 5/1994 | Kaneko | .................. B60L 50/51 318/500 |
| 2012/0299377 A1 | * | 11/2012 | Masuda | .................. B60L 50/40 307/10.1 |
| 2013/0249495 A1 | * | 9/2013 | Ang | ..................... H01M 10/443 320/134 |
| 2015/0349582 A1 | * | 12/2015 | Maeno | .................... B60L 58/15 320/101 |
| 2016/0152151 A1 | * | 6/2016 | Yang | ....................... B60L 58/27 320/109 |
| 2016/0207403 A1 | * | 7/2016 | Iida | ........................... H02J 7/00 |
| 2016/0229411 A1 | * | 8/2016 | Murata | .................... B60L 58/12 |
| 2018/0001774 A1 | * | 1/2018 | Murata | ............. H02J 7/007192 |

FOREIGN PATENT DOCUMENTS

| | | |
|---|---|---|
| JP | 2012-096712 A | 5/2012 |
| JP | 2017-030668 A | 2/2017 |

* cited by examiner

*Primary Examiner* — Rexford N Barnie
*Assistant Examiner* — David A Shiao
(74) *Attorney, Agent, or Firm* — Sughrue Mion, PLLC

(57) ABSTRACT

A control device of a vehicle includes a controller performing overheat protection control on parts, distinguish first, second, and third parts groups among the parts of the vehicle, set only the first and the third parts group as protection targets in a charging mode while the vehicle stops, set only the second and the third parts group as the protection targets when the vehicle is in a mode other than the charging mode while the vehicle is running, and not to perform the overheat protection control when the vehicle is in a mode other than the charging mode while the vehicle stops.

4 Claims, 2 Drawing Sheets

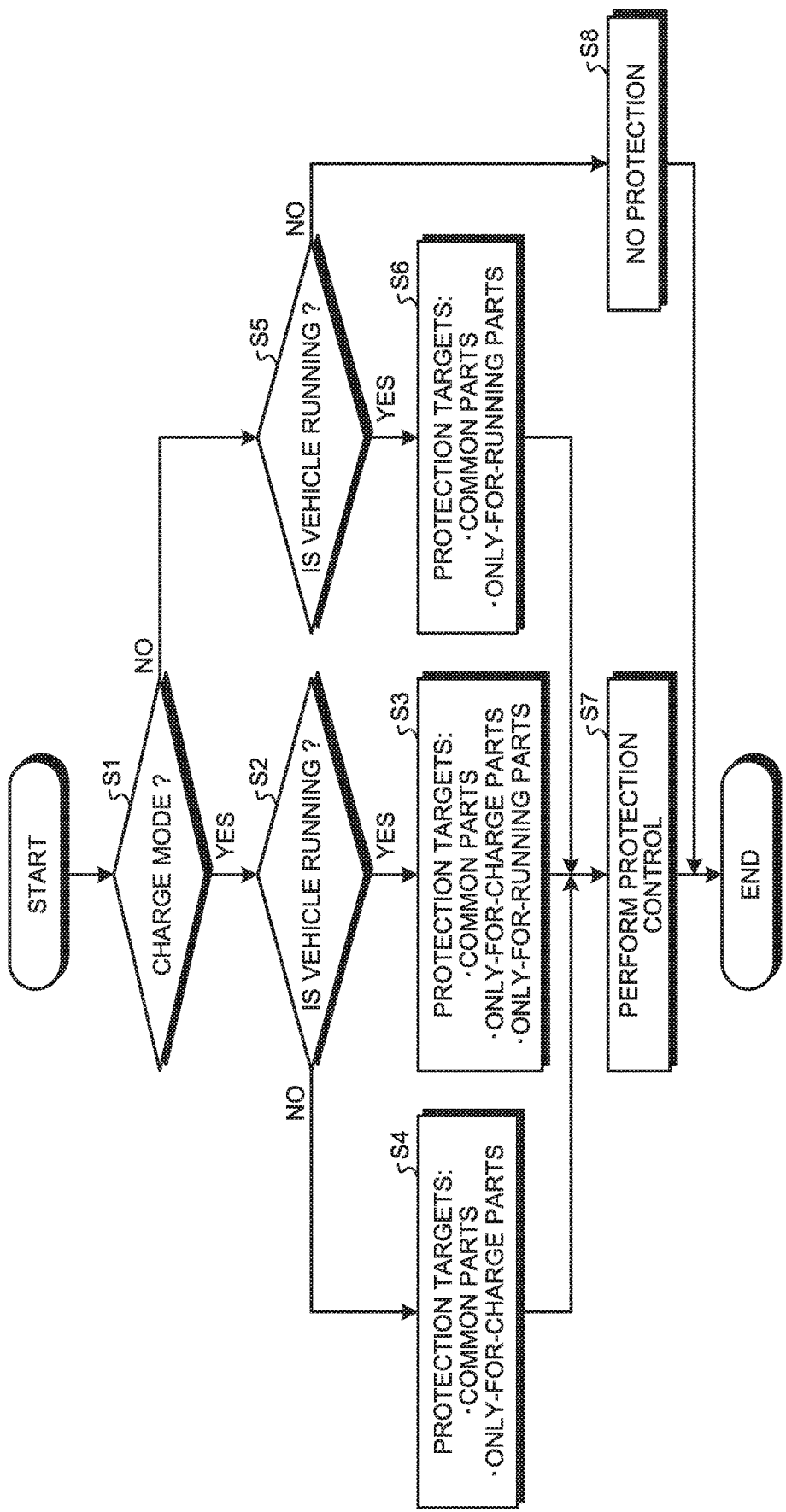

CONTROL DEVICE OF VEHICLE WITH OVERHEAT PROTECTION CONTROL

CROSS-REFERENCE TO RELATED APPLICATION(S)

The present application claims priority to and incorporates by reference the entire contents of Japanese Patent Application No. 2018-182510 filed in Japan on Sep. 27, 2018.

BACKGROUND

The present disclosure relates to a control device of a vehicle.

Japanese Laid-open Patent Publication No. 2017-030668 discloses that, in a hybrid vehicle on which a motor and battery are mounted, while charging an electric power generated by the motor to the battery, overheat protection control is performed for protecting component parts such as the motor, an inverter, and the battery from heat generated by the electrification so as to switch magnitude of the charged power to the battery according to a temperature of cooling water of the motor.

SUMMARY

There is a need for providing a control device of a vehicle which can appropriately protect electrified parts that are subjected to overheat protection control according to a state of the vehicle.

According to an embodiment, there is provided a control device of a vehicle, the vehicle including a motor to run the vehicle, a battery that stores electric power to be supplied to the motor, and a controller that performs overheat protection control on parts in which a current flows while charging the battery, the vehicle being capable of charging a power from an external power source in the battery, the controller distinguishing first, second, and third parts groups one from another, the first parts group being electrified during a charging mode, in which a power is supplied from the external power source to the battery, regardless of whether the vehicle is running, the second parts group being electrified while the vehicle is running regardless of whether the vehicle is in the charging mode, the third parts group being electrified when the vehicle is running and when the vehicle is in the charging mode, setting only the first parts group and the third parts group as protection targets, to which the overhear protection is applied, in the charging mode while the vehicle stops, and setting only the second parts group and the third parts group as the protection targets when the vehicle is in a mode other than the charging mode while the vehicle is running, and the controller does not perform the overheat protection control when the vehicle is in a mode other than the charging mode while the vehicle stops.

BRIEF DESCRIPTION OF THE DRAWINGS

FIG. 2 is a flow chart illustrating a setting control flow of groups of parts to be protected.

DETAILED DESCRIPTION

Figure 1:
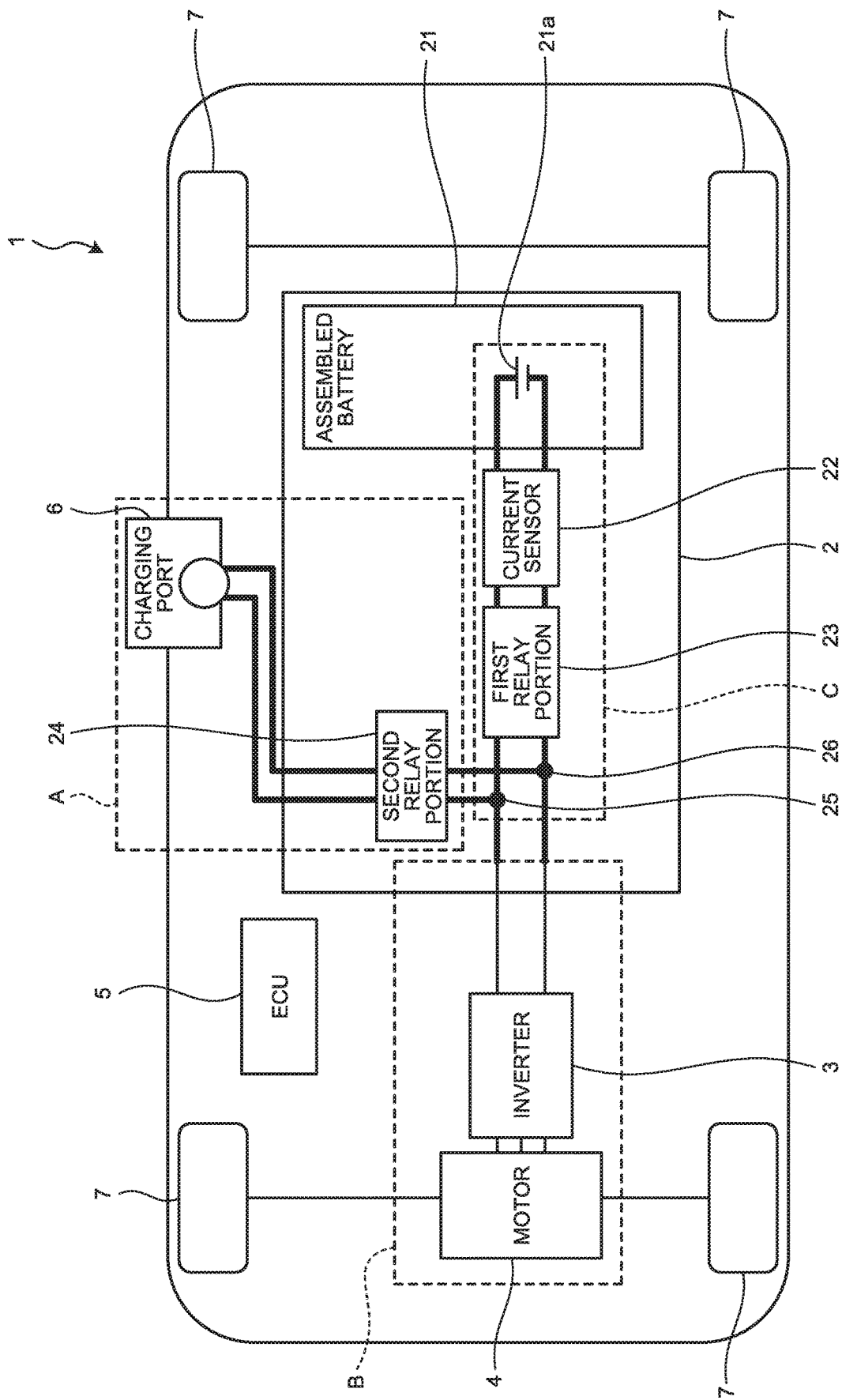
FIG. 1 is a view schematically illustrating a vehicle according to an embodiment of the present disclosure.

In the related art, the disclosed configuration in Japanese Laid-open Patent Publication No. 2017-030668 does not sufficiently take into consideration a case of charging electric power supplied from an external power source (a power source outside the vehicle) to an in-vehicle battery. In the case of charging the in-vehicle battery quickly by a charging station for supplying direct current power as an external power source, since a current value of a charging current becomes high, overheat protection control is required to be performed to parts that are electrified during the charging.

Further, in a vehicle on which a motor and a battery are mounted, it is considered that such overheat protection control is not required to be performed to the parts that are not electrified during the charging. While electric power from an external power source is charged to an in-vehicle battery, the vehicle does not necessarily stop, and there is a case where, even while running, the vehicle receives the electric power from an external power source, whereby the battery can be charged. Thus, in the case of performing the overheat protection control for the charge from an external power source, it is desired to appropriately select the parts that are not to be electrified during charge depending on a state of the vehicle.

Hereinafter, a control device of a vehicle according to an embodiment of the present disclosure will be described with reference to the accompanying drawings. Note that the present disclosure is not limited to the embodiment described below.

FIG. 1 is a view schematically illustrating a vehicle according to an embodiment. A vehicle 1 includes a battery pack 2, an inverter 3, a motor 4, an Electric Control Unit (ECU) 5, a charging port 6, and wheels 7. This vehicle 1 is an electric vehicle that uses the motor 4 as a motive power source for running, and the battery pack 2 that stores electric power to be supplied to the motor 4 is mounted thereon. The electric power in the battery pack 2 is supplied via the inverter 3 to the motor 4, thereby driving the motor 4. Further, the vehicle 1 of FIG. 1 is a front wheel drive car, and motive power output from the motor 4 is transmitted only to front wheels among the four wheels 7. Moreover, the vehicle 1 is capable of charging electric power that is supplied from an external power source (not illustrated) via the charging port 6 to the battery pack 2.

The battery pack 2 includes an assembled battery 21, a current sensor 22, a first relay portion 23, a second relay portion 24, a first connecting point 25, and a second connecting point 26. This battery pack 2 is a unit composed of plural component parts. On the vehicle 1, the battery pack 2 as one unit is mounted.

The assembled battery 21 is a battery having plural battery cells 21a. This assembled battery 21 is composed of a secondary battery that can store electric power that is to be supplied to the motor 4. When driving the motor 4, electric power output from the assembled battery 21 is supplied via the inverter 3 to the motor 4. Further, the assembled battery 21 can store not only electric power supplied via the charging port 6 from an external power source but also electric power generated by the motor 4 with a regenerative brake.

The current sensor 22 is a sensor that detects a current flowing into and out of the assembled battery 21. As illustrated in FIG. 1, the current sensor 22 is provided between the assembled battery 21 and the first relay portion 23. The current sensor 22 can detect a current value of a current (a charging current) that flows into a positive electrode of the assembled battery 21 during the charge, and can detect a current value of a current (a discharging current) that flows out of the positive electrode of the assembled battery 21 during the discharge. Further, the current value detected by the current sensor 22 is output from the current sensor 22 to the ECU 5.

The first relay portion 23 is composed of two switching elements that are provided between the assembled battery 21 and the inverter 3, and includes a positive electrode-side switching element that is provided on a positive electrode side in the assembled battery 21 and a negative electrode-side switching element that is provided on a negative electrode side in the assembled battery 21. Then, during the charge from the external power source (during a charge mode), the first relay portion 23 connects the charging port 6 and the assembled battery 21 so as to electrically conduct therebetween. Further, also during the discharge for supplying electric power in the assembled battery 21 to the motor 4 (while running), the first relay portion 23 connects the assembled battery 21 and the motor 4 so as to electrically conduct therebetween.

The second relay portion 24 is composed of two switching elements that are provided between the charging port 6 and the assembled battery 21, and includes a positive electrode terminal-side switching element that is provided on a positive electrode terminal side in the charging port 6 and a negative electrode terminal-side switching element that is provided on a negative electrode terminal side in the charging port 6. Then, during the charge from the external power source (during the charge mode), the second relay portion 24 connects the charging port 6 and the assembled battery 21 so as to electrically conduct therebetween. In a mode other than the charge mode, the second relay portion 24 cuts between the charging port 6 and the assembled battery 21 so as not electrically conduct therebetween. Further, between the second relay portion 24 and the assembled battery 21, the first connecting point 25 on the positive electrode side and the second connecting point 26 on the negative electrode side are provided.

The first connecting point 25 and the second connecting point 26 are connecting points provided between the first relay portion 23 and the inverter 3, and are the connecting points for electrically connecting the charging port 6 to the assembled battery 21. The first connecting point 25 is a connecting point for connecting the positive electrode terminal of the charging port 6 to the positive electrode side of the assembled battery 21. The second connecting point 26 is a connecting point for connecting the negative electrode terminal of the charging port 6 to the negative electrode side of the assembled battery 21.

The charging port 6 is a connecting unit which has the positive electrode terminal and the negative electrode terminal and is to be connected to an external power source such as a charging station. For example, in the case where the external power source is a DC charging station that outputs direct current power (a quick charging station), a charging plug provided in the Direct Current (DC) charging station is to be connected to the charging port 6. The charging port 6 in this case is a DC inlet (a quick charging inlet). Further, the charging port 6 has a function to be connected to an external power source while the vehicle 1 is running. For example, an arm is connected to the charging port 6. Then, by allowing this arm to contact with a power transmission member that is provided outside the vehicle 1 while the vehicle 1 is running, electric power from the external power transmission member is input via the arm to the charging port 6. The electric power input into this charging port 6 can be stored into the assembled battery 21. Note that the below-described charge mode is a mode for charging electric power supplied via the charging port 6 from the external power source.

The inverter 3 is a power converter that converts the direct current power supplied from the assembled battery 21 into alternating current power and supplies the alternating current power to the motor 4. The inverter 3 is provided with plural switching elements that correspond to respective phases of the motor 4. These plural switching elements that composes the inverter 3 are switched on and off by a switching control by the ECU 5. That is, the inverter 3 is controlled by the ECU 5.

The motor 4 is driven by consuming the electric power that is stored in the battery pack 2, while the vehicle 1 is running. This motor 4 is composed of a three-phase AC motor. In the vehicle 1, a transmission or a differential device (none of them are illustrated) may be provided between the motor 4 and the wheel 7. Further, the motor 4 can exert both of a motor function and a power generating function. Also, the motor 4 functions as a regenerative brake, and the electric power generated by the motor 4 can be charged to the battery pack 2.

The ECU 5 is composed of an electronic control device including a Central Processing Unit (CPU), a memory unit that stores data such as various programs, an arithmetic processing unit that performs various calculations for controlling to drive the motor 4 and a control unit that performs various kinds of controls. For example, as a result of calculation by the arithmetic processing unit, a command signal for controlling the inverter 3 is output from the ECU 5 to the inverter 3. The command signal includes a switching command for switching a switching element, that is subjected to control of a switching operation, among plural switching elements that constitute the inverter 3.

Further, the ECU 5 performs a charge mode for charging the electric power supplied from the external power source to the assembled battery 21. The ECU 5 controls the first relay portion 23 and the second relay portion 24 so that the charging port 6 and the assembled battery 21 can be connected so as to electrically conduct therebetween during the charge mode. The charge mode explained here means a state where the electric power supplied from an external power source is stored via the charging port 6 into the assembled battery 21 in the battery pack 2.

Moreover, the ECU 5 performs overheat protection control for protecting the component parts in which a charging current flows while charging electric power from the external power source to the assembled battery 21 (during the charge mode).

The overheat protection control is control, which is for suppressing an overheat of the electrified parts, and includes calculating a predetermined evaluation value based on the current value detected by the current sensor 22 and limiting an input (charged power Win) and an output (discharged power Wout) of the electric power into and out of the assembled battery 21, if the evaluation value is equal to or greater than a predetermined value. The evaluation value is calculated based on a predetermined arithmetic expression. The arithmetic expression is formularized so that the higher the current value detected by the current sensor 22 is, the higher the evaluation value to be calculated becomes. The ECU 5 calculates the evaluation value using the arithmetic expression. That is, when the overheat protection control is performed by the ECU 5 during the charge mode, the electric power to be input into the assembled battery 21 is limited, whereby the charging current to flow into the assembled battery 21 becomes low. Such a low charging current can suppress a temperature increase of the component parts that are electrified by the charging current.

For example, in the case of connecting the charging port 6 to a quick charging station for supplying direct current power so as to charge electric power to the assembled battery 21 quickly while the vehicle 1 stops, a high current flows in the parts that are electrified. Thus, in order to suppress heating of the parts that are involved in the electrification during the charge mode, the ECU 5 performs the overheat protection control. The current value of the charging current generated by this rapid charge becomes high. In addition, in order to extend a cruising distance of the vehicle 1, a chargeable capacity is required to be increased, so that it can be considered to increase the assembled battery 21 so as to increase a size of the battery pack 2. In this case, a charging time to complete charging the battery pack 2 with such a high capacity becomes longer than a charging time of the battery pack 2 with a middle capacity. In the case of performing the rapid charge, since the charging current becomes high, and the charging time becomes longer according to the extension of the cruising distance, appropriate overheat protection is desired to be performed. Then, the ECU 5 in the embodiment is provided so as to divide the parts to be subjected to the overheat protection (hereinafter may be referred to as "overheat protection target parts") into groups according to the state of the vehicle so that the overheat protection controls can be performed respectively to the groups of the parts.

As the parts to be subjected to the overheat protection control, the parts included in the vehicle 1 can be divided into three groups. A first parts group A includes parts that are used only during the charge mode (hereinafter may be referred to as "only-for-charge parts"). A second parts group B includes parts that are used only while the vehicle 1 is running (hereinafter may be referred to as "only-for-running parts"). A third parts group C includes parts that are used in each of during the charge mode and while running (hereinafter may be referred to as "common parts").

The first parts group A is composed of the parts in which a current (a charging current) flows only during the charge mode, and includes the charging port 6 and the second relay portion 24. In the case of driving the motor 4 by electric power of the assembled battery 21, the second relay portion 24 is open, whereby no discharging current flows in the first parts group A. This first parts group A has no current sensor provided.

The second parts group B is composed of the parts in which a current (a discharging current) flows only while running, and includes the inverter 3 and the motor 4. In the case of charging the electric power from an external power source to the assembled battery 21 (during the charge mode), the respective switching elements of the inverter 3 are open, whereby no charging current flows in the second parts group B. This second parts group B has no current sensor provided.

The third parts group C is composed of the parts that are electrified both during the charge mode and while running, and includes the current sensor 22 and the first relay portion 23. During the charge mode, the first relay portion 23 and the second relay portion 24 are closed, whereby a charging current flows in the third parts group C. In addition, while the vehicle 1 is running, the second relay portion 24 is open and the first relay portion 23 is closed, whereby a discharging current flows in the third parts group C.

Further, the ECU 5 judges whether the vehicle 1 is in the charge mode and whether the vehicle 1 is running or stops, and sets the electrified parts as the protection targets appropriately. An example of the setting control is illustrated in FIG. 2.

FIG. 2 is a flow chart illustrating a setting control flow of the groups of the parts that are the protection targets. The control illustrated in FIG. 2 is performed by the ECU 5.

First, the ECU 5 determines whether the vehicle 1 is in the charge mode or not (Step S1). In Step S1, the ECU 5 can determine whether the vehicle 1 is in the charge mode by mode discrimination. For example, the ECU 5 determines whether a flag indicating that it is in the charge mode is ON. Further, the ECU 5 may determine whether a direction of the current flowing in the battery pack 2 is a charging direction. Alternatively, the ECU 5 may determine whether a charging plug of a charging station is connected to the charging port 6.

In the case of determining as affirmative in Step S1 because of being in the charge mode (Step S1: Yes), the ECU 5 determines whether the vehicle 1 is running (Step S2). In Step S2, a vehicle mode is judged. In the case where the vehicle mode is a running mode, it is determined as affirmative in Step S2. Note that, in Step S2, in the case where a speed sensor, which is not illustrated, detects that the wheel 7 is rotated, the ECU 5 may determine that the vehicle 1 is running.

In the case of determining as affirmative in Step S2 because the vehicle 1 is running (Step S2: Yes), the ECU 5 sets the first parts group A that includes the only-for-charge parts, the second parts group B that includes the only-for-running parts and the third parts group C that includes the common parts as the overheat protection target parts (Step S3). Since the case of determining as affirmative in Step S2 is the case where the vehicle 1 is running during the charge mode, the first parts group A, the second parts group B and the third parts group C become the protection targets. Then, after setting the protection targets in Step S3, the ECU 5 performs the overheat protection control to these protection targets (Step S7). After performing Step S7, this control routine ends.

In the case of determining as negative in Step S2 because the vehicle 1 stops (Step S2: No), the ECU 5 sets the first parts group A that includes the only-for-charge parts and the third parts group C that includes the common parts as the overheat protection target parts (Step S4). Since the case of determining as negative in Step S2 is the case of charging from an external power source in the state that the vehicle 1 stops, the first parts group A and the third parts group C become the protection targets. Then, after setting the protection targets in Step S4, the control routine proceeds from Step S4 to Step S7, where the ECU 5 performs the overheat protection control to these protection targets.

In the case of determining as negative in Step S1 because of being in a mode other than the charge mode (Step S1: No), the ECU 5 determines whether the vehicle 1 is running or not (Step S5). In Step S5, a process similar to that in Step S2 described above is performed.

In the case of determining as affirmative in Step S5 because the vehicle 1 is running (Step S5: Yes), the ECU 5 sets the second parts group B that includes the only-for-running parts and the third parts group C that includes the common parts as the overheat protection target parts (Step S6). Since the case of determining as affirmative in Step S5 is the situation that the vehicle 1 is running in a mode other than the charge mode, the second parts group B and the third parts group C become the protection targets. Then, after setting the protection targets in Step S6, this control routine proceeds from Step S6 to Step S7, where the ECU 5 performs the overheat protection control to these protection targets.

In the case of determining as negative in Step S5 because the vehicle 1 stops (Step S5: No), the component parts are not protected (Step S8), and this control routine is finished. The case of determining as negative in Step S5 is the state that the vehicle 1 stops in a mode other than the charge mode. If proceeding to this Step S8, the ECU 5 does not perform the overheat protection control.

As described above, according to the embodiment, by judging whether the vehicle 1 is in the charge mode and whether the vehicle 1 is running or stops, and also by considering the case of charging electric power from an external power source while running, the groups of the parts that need the overheat protection can be switched appropriately. Thereby, the groups of the parts that need the overheat protection can be selected appropriately according to the state of the vehicle, and the component parts of the vehicle 1 can be protected.

Further, the ECU 5 judges the state of the vehicle according to the vehicle mode, it is not necessary to provide the current sensor for each group of the parts. That is, the current sensor 22 is required to be provided only to the third parts group C that is the common parts, among the three parts groups A, B and C. Thereby, the number of the current sensors can also be reduced.

In the above-described vehicle 1, the structure of connecting the arm to the charging port 6 and charging electric power from an external power source to the assembled battery 21 while running has been explained. However, note that a method for receiving electric power from the external power source is not limited to this. For example, a second charging port (not illustrated) to which the arm is connected may be provided beside the charging port 6. In this case, between the second charging port and the assembled battery 21, a third relay portion (not illustrated) is provided. Further, in the case where the vehicle 1 is running during the charge mode, the second charging port and the third relay portion are included in the protection targets, but the charging port 6 and the second relay portion 24 may be excluded from the protection targets.

According to the present disclosure, during the charge mode for charging from an external power source, and by judging whether the vehicle is running, the group of the parts to be subjected to the overheat protection control can be switched appropriately. Thereby, the group of the parts to be subjected to the overheat protection control can be set appropriately according to the state of the vehicle.

According to an embodiment, it is possible to judge whether a vehicle is in the charge mode and whether the vehicle is running or stops so as to appropriately set a group of parts to be subjected to the overheat protection control.

According to an embodiment, the overheat protection control for limiting input and output of the battery can be performed based on the evaluation value that is calculated using the current value. Thereby, the overheat protection control can be performed to the group of the parts that is appropriately set during charge and during discharge.

Further, according to an embodiment, the first relay portion connects the battery and the motor so as to electrically conduct therebetween during the charge mode and while the vehicle is running, a charging port is connected via the second relay portion to a connecting point that is provided between the first relay portion and the inverter, and thus the second relay portion may connect the charging port and the battery so as to electrically conduct therebetween during the charge mode, and may cut between the charging port and the battery so as not to be electrically conductive when it is not in the charge mode.

According to an embodiment, since each of the relay portions is subjected to the protection in the state of being connected electrically conductively, a group of the parts in which a current flows and which require the overheat protection can be set appropriately during the charge mode and according to the state of the vehicle.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device of a vehicle, the vehicle including a motor to run the vehicle,
   a battery that stores electric power to be supplied to the motor, and
   a controller that performs overheat protection control on parts in which a current flows while charging the battery by limiting the electric power into and out of the battery based on detected current of the battery, the vehicle being capable of charging the battery by receiving the electric power from an external power source, wherein,
   the controller is configured to:
      distinguish a first parts group, a second parts group, and a third parts group one from another, the first parts group being electrified during a charging mode, in which a power is supplied from the external power source to the battery, regardless of whether the motor of the vehicle is running, the second parts group including the motor of the vehicle and being electrified while the motor of the vehicle is running regardless of whether the vehicle is in the charging mode, the third parts group being electrified when the motor of the vehicle is running and when the vehicle is in the charging mode,
      set only the first parts group and the third parts group as protection targets, to which the overheat protection control is applied, by disconnecting the second parts group from the battery in the charging mode while the motor of the vehicle stops,
      set only the second parts group and the third parts group as the protection targets by disconnecting the first parts group from the battery when the vehicle is in a mode other than the charging mode while the motor of the vehicle is running,
      set the first parts group, the second parts group and the third parts group as the protection targets based on the motor of the vehicle running in the charging mode, and
   the controller is configured not to perform the overheat protection control when the vehicle is in a mode other than the charging mode while the vehicle stops.

2. The control device of a vehicle according to claim 1, the vehicle further comprising:
   a charging port to be connected to the external power source;
   an inverter that is provided between the battery and the motor;
   a first relay portion that is provided between the inverter and the battery; and
   a second relay portion that is provided between the charging port and the battery, wherein the first parts group includes the charging port and the second relay portion, the second parts group includes the motor and the inverter, and the third parts group includes the first relay portion.

3. The control device of a vehicle according to claim 2, wherein the third parts group further includes a current sensor that is provided between the first relay portion and the battery, the overheat protection control is a control for limiting the electric power into and out of the battery based on an evaluation value, calculated by using a current value detected by the current sensor, being equal to or greater than a predetermined value, and the evaluation value becomes greater as the current value becomes greater.

4. The control device of a vehicle according to claim 2, wherein the first relay portion connects the battery and the motor so as to electrically conduct therebetween during the charging mode or while the motor of the vehicle is running, the charging port is connected, via the second relay portion, to a connecting point that is provided between the first relay portion and the inverter, and the second relay portion connects the charging port and the battery so as to electrically conduct therebetween during the charging mode, and cuts a connection between the charging port and the battery so as not to be electrically conductive therebetween in a mode other than the charging mode.

* * * * *